(12) United States Patent
Kovar et al.

(10) Patent No.: US 7,120,364 B2
(45) Date of Patent: Oct. 10, 2006

(54) OPTICAL MODULATOR AND METHOD FOR POLARIZATION BIT INTERLEAVING

(75) Inventors: George Kovar, Nepean (CA); Edmond J. Murphy, West Hartford, CT (US); Richard Habel, Ottawa (CA); Jozef Finak, Kanata (CA)

(73) Assignees: JDS Uniphase Corporation, San Jose, CA (US); JDS Uniphase Inc., Ottawa (CA)

( * ) Notice: Subject to any disclaimer, the term of this patent is extended or adjusted under 35 U.S.C. 154(b) by 804 days.

(21) Appl. No.: 09/898,379

(22) Filed: Jul. 5, 2001

(65) Prior Publication Data

US 2002/0063919 A1    May 30, 2002

Related U.S. Application Data

(60) Provisional application No. 60/216,669, filed on Jul. 7, 2000.

(51) Int. Cl.
*H04B 10/04* (2006.01)

(52) U.S. Cl. .................. 398/190; 398/187; 398/188

(58) Field of Classification Search .................. 398/65, 398/77, 85, 183–189, 190
See application file for complete search history.

(56) References Cited

U.S. PATENT DOCUMENTS

| | | | | |
|---|---|---|---|---|
| 3,956,626 | A * | 5/1976 | Ross | 398/184 |
| 5,111,322 | A * | 5/1992 | Bergano et al. | 398/74 |
| 5,473,457 | A * | 12/1995 | Ono | 398/185 |
| RE36,715 | E * | 5/2000 | Taylor | 359/156 |
| 6,057,950 | A | 5/2000 | Bergano | 359/181 |
| 6,219,172 | B1 * | 4/2001 | Yariv | 359/264 |
| 6,607,313 | B1 * | 8/2003 | Farries et al. | 398/102 |
| 6,650,846 | B1 * | 11/2003 | Ito | 398/184 |
| 6,714,742 | B1 * | 3/2004 | Hayee et al. | 398/65 |

OTHER PUBLICATIONS 1.04 Tbit/s DWDM Transmission experiment based on Alternate-Polarization 80-Gbit/s OTDM Signals Miyamoto et al., ECOC '98, Sep. 20-24, 1998, Madrid Spain pp. 55-57.

\* cited by examiner

*Primary Examiner*—Dzung Tran
(74) *Attorney, Agent, or Firm*—Lacasse & Associates, LLC; Randy W. Lacasse

(57) ABSTRACT

The invention relates to optical communications using techniques for providing efficient high speed polarization bit interleaving. One common architecture for high-speed time-division-multiplexing employs two modulators having a same bit rate, wherein two separately modulated streams of data bits are combined into a high-speed single serial stream of data bits, instead of providing a single higher-cost higher-speed modulator. The present invention has found with the availability of fast data modulators, that polarization bit interleaving can be employed more efficiently for higher speed data transmission in optical network systems by providing an optical modulator including a single data modulator, rather than multiplexing different data streams from different modulators. The present invention provides an optical modulator for encoding data on orthogonally polarized alternate light pulses comprising: means for modifying a laser light beam to a pulse train at a first frequency; a data modulator for encoding signal data on the pulse train at a second data stream frequency where the second frequency is greater than or equal to the first frequency; means for rotating a polarization state of at least alternate light pulses of the pulse train to provide a data stream of orthogonally polarized alternate light pulses.

10 Claims, 3 Drawing Sheets

OPTICAL MODULATOR AND METHOD FOR POLARIZATION BIT INTERLEAVING

CROSS-REFERENCE TO RELATED APPLICATIONS

This application claims priority from U.S. application No. 60/216,669, filed Jul. 7, 2000.

MICROFICHE APPENDIX

Not Applicable.

TECHNICAL FIELD

The present application relates to optical communications using techniques for providing efficient high speed polarization bit interleaving.

BACKGROUND OF THE INVENTION

High-speed time-division-multiplexing (TDM) is a very attractive way of enhancing the spectrum efficiency of a large-capacity wavelength-division multiplexing (WDM) system. One common architecture employs two modulators having a same bit rate, wherein two separately modulated streams of data bits are combined into a high-speed single serial stream of data bits. Instead of providing a single higher-cost higher-speed modulator capable of providing modulation at a frequency of n Hz, two modulators having a frequency of n/2 Hz are provided and their outputs are time-interleaved providing a signal having a frequency of n Hz. However, one drawback to such a scheme, particularly in high-speed dense systems is that pulses from adjacent time slots spread and partially overlap one another and detection errors sometimes occur at a receiver end.

One remedy for this is provided by an enhanced TDM system wherein adjacent interleaved pulses are distinguishable as they are orthogonally polarized. Such a scheme is described in a paper entitled 1.04-Tbit/s SWDM Transmission Experiment Based on Alternate-Polarization 80-Gbit/s OTDM Signals, by Yutaka Miyamoto et al., published in ECOC'98 20–24 September 1998 Madrid, Spain. In this paper alternate-polarization optical-TDM is described to increase the bit rate while keeping the signal spectrum from broadening. Here two modulated signals are time-division multiplexed with additional enhancement being achieved by polarization multiplexing of the two interleaved TDM streams.

Another system using enhanced polarization optical TDM is described and illustrated in U.S. Pat. No. 5,111,322 in the name of Bergano et al, entitled Polarization Multiplexing Device with Solitons and Method Using Same, incorporated herein by reference. In this patent, a transmission system's capacity is increased by using a combination of polarization and time-division multiplexing. More specifically, two streams of differently (preferably orthogonally) polarized solitons are interleaved (time-division-multiplexed) at a transmitter, and later separated at the receiver to recover both data streams.

Fast modulators (eg. 40 Gbit/s), with a potential of up to double this rate) are also available instead of time division multiplexing signals from two slower modulators. However, problems of pulse broadening and jitter in a high speed pulse stream cause the pulses to begin to overlap and act coherently causing non-linear interactions and interference with the result that the signal cannot travel as far with an acceptable error rate as slower bit rate systems. Polarization multiplexing, as disclosed in U.S. Pat. No. 5,111,322 prevents the non-linear interactions. Since the alternately polarized pulses cannot interact, the signal can travel farther at the same bit error rate. The method of providing the polarization multiplexing taught by Bergano, however, is difficult to realize.

The Bergano device, shown in prior art FIG. 1, provides a mode locked laser light source 201 which outputs a train of pulses at a pulse repetition frequency of, for example, 2.5 GHz, ie. half the desired rate of the output signal. The pulse train is then split by a polarization beam splitter 202 into two beams of equal amplitude having orthogonal polarization. Each beam travels through a data modulator 205,206 operating at the 2.5 Gbit/s rate. A delay line (not shown) is needed to ensure that the pulses in the two beams arrive at the two modulators 205,206 simultaneously. At the same time, the RF signals for both modulators also need to be synchronized with the pulses. At 2.5 Gbit/s this synchronization is not such a difficult problem as for a 40 Gbit/s system or faster. As further taught by Bergano, polarization controllers 211–214 are required to maintain the required linear polarizations. After passing through the data modulators 205,206, one of the pulse trains is delayed at delay line 209 by half of the period enabling the two orthogonally polarized beams to be recombined at the polarization splitter 210 providing a signal output at 5 Gb/s.

The use of two data modulators, in Bergano, and two associated drivers makes this system expensive and rather complex. Two broad band modulators, and two associated data drivers are required. The optical pulses in the two arms need to be synchronized with sub-picosecond accuracy to arrive at the modulators at precisely the same time. A further problem of electrical cross talk occurs between the two modulators, particularly in an integrated design. The mode locked laser has a modulation which must also be synchronized with the data modulators. This synchronization is somewhat more difficult. In addition, the RF data needs to be synchronized with the optical pulse trains with the same precision. This requires at least one, but usually two electrical delay lines. In addition, the powers in the two arms need to be equalized, usually requiring a variable optical attenuator in each arm.

It is desired to provide a simple and economical device and method for providing polarization bit interleaving using a single data modulator.

SUMMARY OF THE INVENTION

The present invention has found with the availability of fast data modulators, that polarization bit interleaving can be employed more efficiently for higher speed data transmission in optical network systems by providing an optical modulator including a single data modulator, rather than multiplexing different data streams from different modulators as taught in the prior art.

Accordingly, the present invention provides an optical modulator for encoding data on orthogonally polarized alternate light pulses comprising:

means for modifying a laser light beam to a pulse train at a first frequency;

a data modulator for encoding signal data on the pulse train at a second data stream frequency where the second frequency is greater than or equal to the first frequency;

means for rotating a polarization state of at least alternate light pulses of the pulse train to provide a data stream of orthogonally polarized alternate light pulses.

Thus an aspect of the present invention provides an integrated data modulator optical circuit comprising:

a laser light source;

a pulse generator comprising a first Mach-Zehnder device integrated on a substrate coupled to the laser light source for producing a pulse train;

a single data modulator comprising a second Mach-Zehnder device integrated on the substrate for encoding data on the pulse train; and means for interleaving alternate pulses of orthogonal polarization onto a single pulse train comprising a third Mach-Zehnder device integrated on the substrate for separating alternate pulses, further including a polarization rotator for rotating at least alternate pulses and a polarization combiner for interleaving alternate pulses.

In accordance with the invention a method of encoding data on a light pulse train of alternate polarization interleaved bits comprises the steps of:

providing a pulse train of light pulses at a first frequency;

encoding data on the pulse train at a second data stream frequency where the second frequency is greater than or equal to the first frequency;

passing at least alternate pulses through a polarization rotator to rotate alternate pulses to orthogonal polarization states; and interleaving the orthogonally polarized pulses, for transmission in an optical system.

BRIEF DESCRIPTION OF THE DRAWINGS

Further features and advantages of the present invention will become apparent from the following detailed description, taken in combination with the appended drawings, in which.

Throughout the drawings like features are identified by like reference numerals.

DETAILED DESCRIPTION OF PREFERRED EMBODIMENTS

Figure 1:
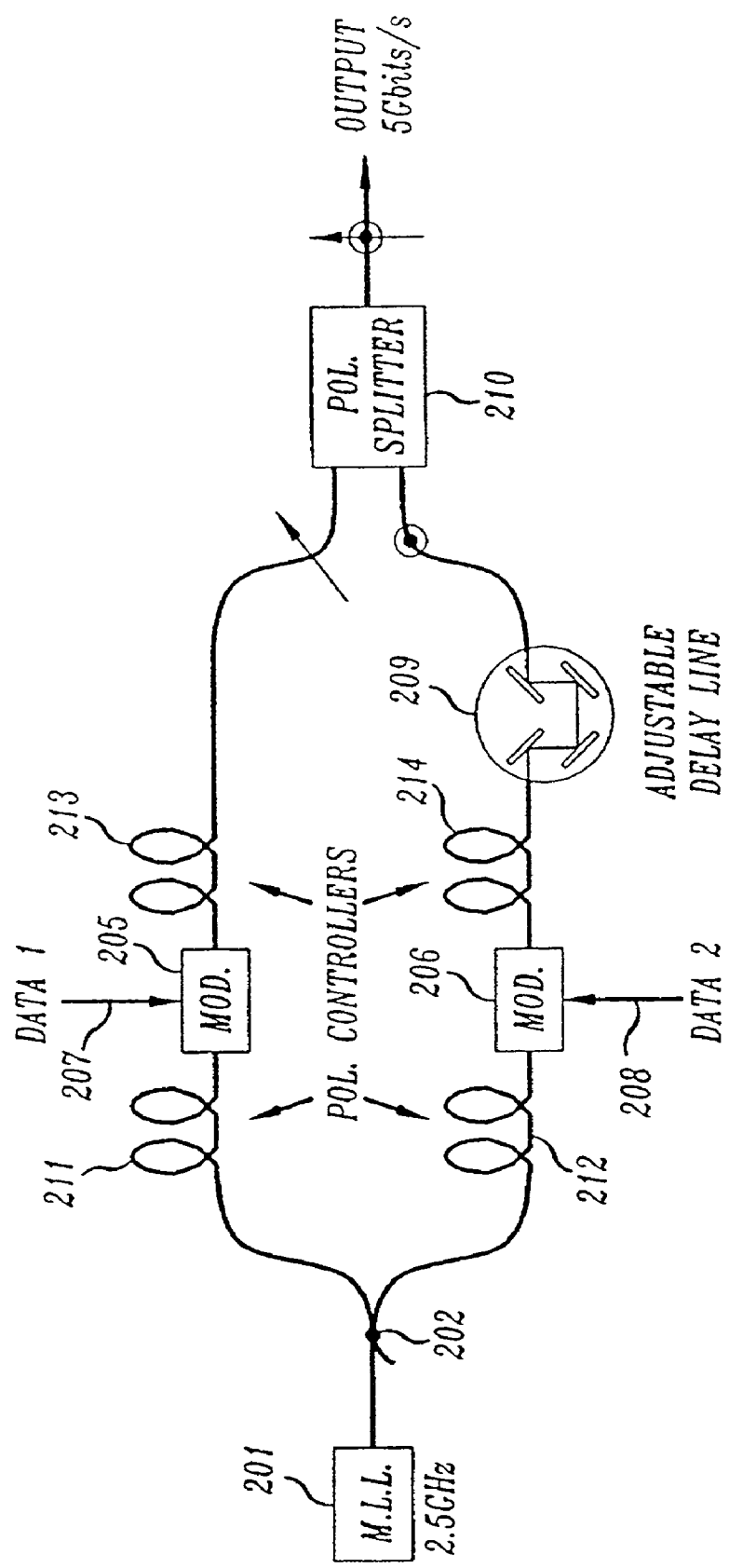
FIG. 1 is a prior art optical modulator for providing polarization interleaving including two data modulators.
Figure 2A:
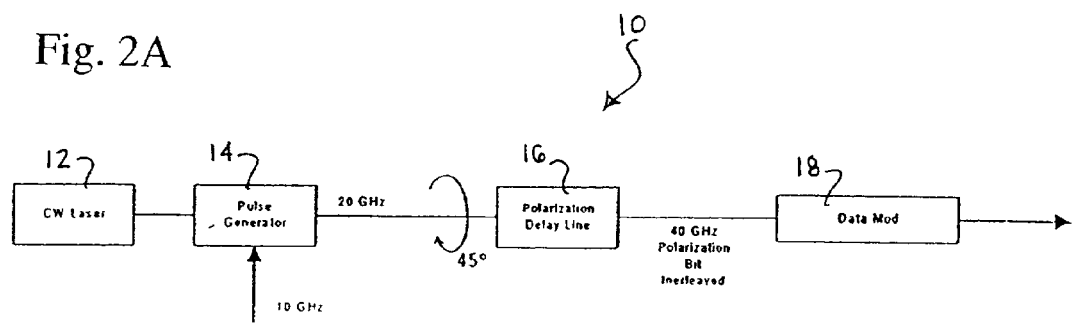
FIG. 2A is a schematic illustration of an optical modulator for polarization interleaving in accordance with the present invention.

FIG. 2A shows a general schematic illustration of the optical modulator 10 for polarization interleaving using a single data modulator. The modulator 10 includes a continuous wave laser 12 and a pulse generator 14. The pulse generator 14 provides a pulse train at 20 GHz. The train of pulses is input into a polarization delay line 16 at 45 degrees to the principal axes. The delay line 16 orients the orthogonal polarization states and delays one component by 25 ps (eg. half the period of the pulse train) with respect to the other. The train of pulses exiting the polarization delay line 16 consists of pulses of alternating orthogonal polarizations and equal amplitudes combined now at 40 GHz. This pulse train is provided to the data modulator 18 for data encoding and launching onto the optical transmission network. This embodiment has the advantage of a simple design which can be integrated on a single substrate. The use of a slower pulse generator further reduces the cost of the device.

The pulse generator 14 is a Mach-Zehnder type modulator. A mode locked laser can also replace the laser and pulse generator to produce a pulse train. A mode locked laser advantageously generates a narrower pulse. However, modulators of the $LiNbO_3$ balanced Mach-Zehnder type are preferred as they produce very low chirp of the light pulses. Of course, other types of modulators may be used, for example electro-absorption or GaAs. The use of Mach-Zehnder modulators on lithium niobate substrate, facilitates construction of the device as an integrated optical modulator on a single substrate.

The data modulator 18, which is conveniently also a Mach-Zehnder type modulator, requires a more complex driver in this embodiment, in order to provide different driving voltages for the different polarization states. Since this type of modulator is optimized for one polarization state, for the other of the polarization states, the required voltage will be quite high.

Figure 2B:
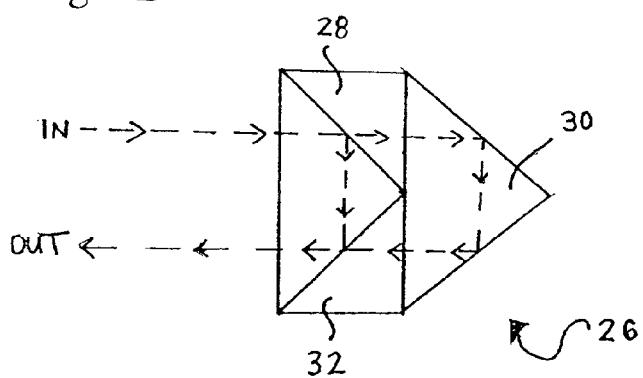
FIG. 2B is a schematic illustration of a bulk optic polarization delay line suitable for use in the embodiment of FIG. 2A.

The polarization delay line 16 may comprise a bulk optic device, or a long length of polarization maintaining fiber or a combination of the two. An example of a polarization delay line in a bulk optic device is shown at 26 in FIG. 2B, in which an input signal IN of linear polarization is passed through a polarization beam splitter 28 at an orientation of 45 degrees to the principal axis of the polarization beam splitter. The polarization beam splitter 28 is arranged to separate orthogonal polarizations and to pass one linear polarization state and reflect the other linear state. The polarization state which passes through, for instance horizontal, is reflected by a corner cube mirror 30 and joined through a second polarization beam splitter 32 with the other polarization state, in this case vertical, which is reflected by the polarization beam splitters 28,32. Thus, both horizontal and vertical polarization states are combined in a single output signal OUT with a relative delay due to the difference in path lengths.

In operation in an optical network, the receiver is not polarization sensitive. Accordingly, the time interleaving of pulses of the present invention can be used simply to increase the data rate to a eg. 40 GHz receiver. Alternatively, the orthogonal polarizations can be separated and directed to two slower, eg. 20 GHz receivers.

Figure 3:
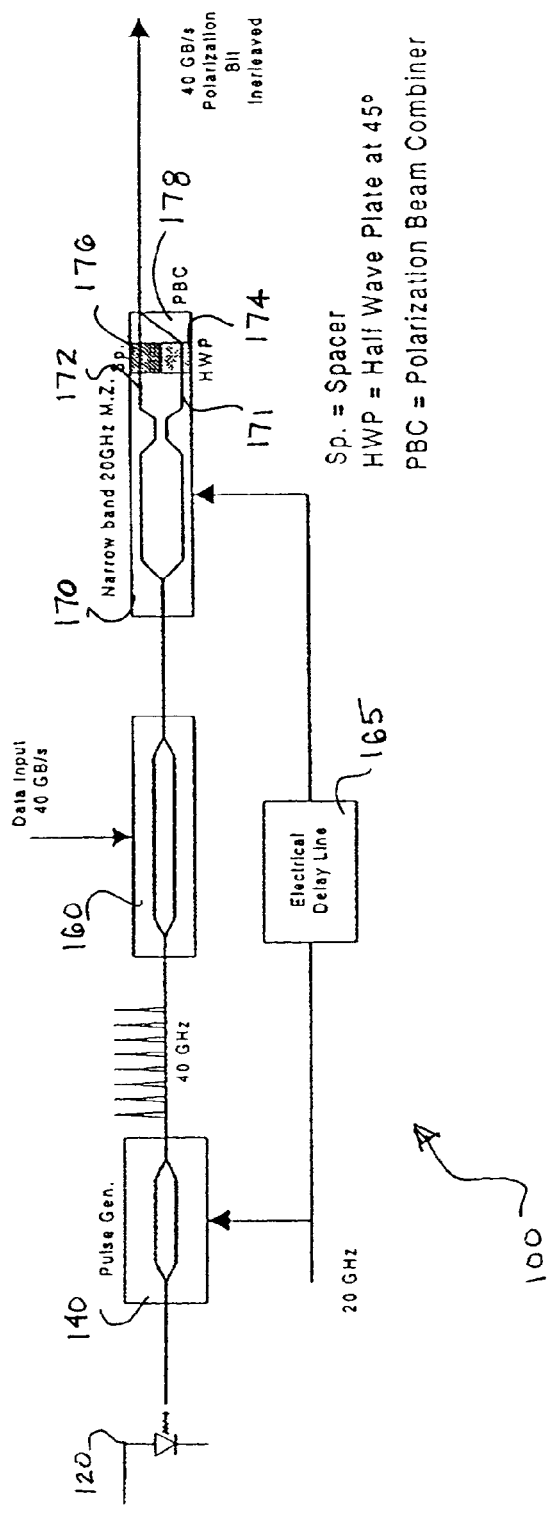
FIG. 3 is a detailed schematic illustration of a further embodiment of the optical modulator in accordance with the present invention.

FIG. 3 shows an alternative embodiment of the invention. In this embodiment shown generally at 100, a continuous wave laser 120 provides light to a 40 GHz pulse generator 140. The 40 GHz pulse train is input into a broad band 40 Gbit/s data modulator 160. Following the data modulator 160, preferably on the same lithium niobate substrate, is a narrow-band Mach Zehnder type modulator 170, for separating alternate pulses. A micro-optic assembly butt coupled to the substrate of the Mach-Zehnder 170 rotates the polarization of half the pulses and recombines the pulses to a stream of alternate orthogonally polarized pulses. The narrow band nature of the signal permits use of narrowband modulation techniques for interleaving the alternate pulses. The pulse generator, data modulator and the narrow-band modulator can all be integrated on the same substrate.

Modulator 170 is driven by a 20 GHz sine wave. The same synthesizer (not shown) can be used to drive both the pulse generator 140 and the modulator 170. A standard RF delay circuit 165 is incorporated to adjust the synchronization of the sine wave signal to the pulse train. Modulator 170 has a first output port 171 and a second output port 172. At the minimum of the sine wave, the output is directed through the first port 171. At the maximum of the sine wave the output is directed through the second port 172. An output from the first port 171 is coupled on a first optical path through a half wave plate 174 which rotates the polarization of the pulses by 90 degrees. Polarization rotation can be achieved using a low order half wave plate, or a quartz polarization rotator. Polarization rotation can also be performed within the lithium niobate waveguide. An output from the second port 172 is coupled on a second optical path, through a spacer 176 to maintain an equal path length, to the first optical path. Light from the first optical path and the second optical path is combined in a polarization beam combiner 178, such as a birefringent crystal or a cube beam splitter with a polarization coating, and launched as a 40 Gb/s data stream of alternate orthogonally polarized pulses.

Figure 4:
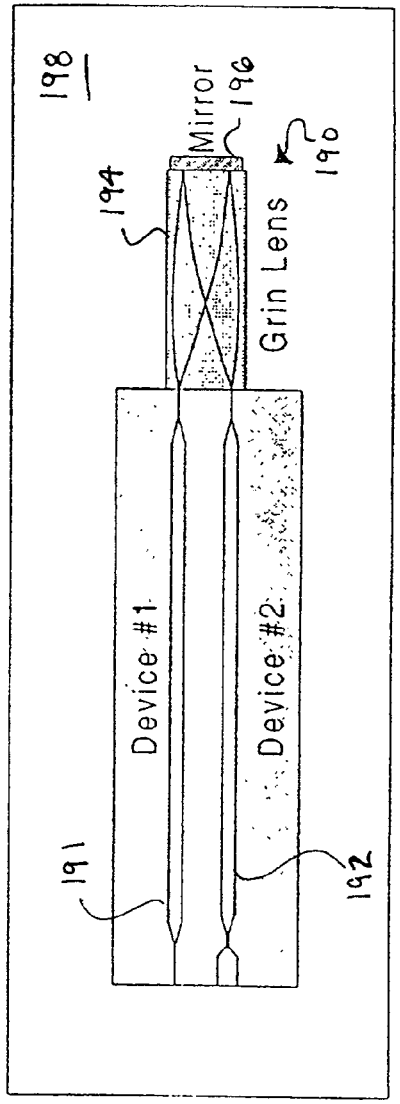
FIG. 4 is a schematic illustration of an integrated layout for use with the present invention.

By integrating the pulse generator, data modulator and the narrow band Mach Zehnder on the same substrate and using micro optics for beam steering, polarization rotation and beam combining, and time delay or synchronization a very compact device is created. In order to obtain sufficient length on the substrate, a double path across a smaller substrate is provided with a device for redirecting the pulse stream from the first path back to the second. A simple device for reversing the direction of beam travel is shown generally at 190 in FIG. 4, in combination with two modulator devices 191, 192 on a lithium niobate substrate 198. A quarter pitch GRIN lens 194 is butt-coupled directly to the substrate 198 substantially symmetrically between the modulator devices 191,192. A broadband reflective coating 196 is deposited directly to the back surface of the lens 194. The diverging light from the first device 191 is collimated by the lens 194, reflected from its back surface 196, and re-focused into the second device 192.

In an integrated design the polarization states are maintained throughout the device by the integrated waveguides. In a non-integrated embodiment, individual modules are coupled with polarization maintaining fiber. In both cases, the output signal is launched into single mode fiber without polarization control.

The embodiments of the invention described above are intended to be exemplary only. The scope of the invention is therefore intended to be limited solely by the scope of the appended claims.

What is claimed is:

1. An optical modulator for encoding data on orthogonally polarized alternate light pulses comprising:
   means for modifying a laser light beam to a pulse train at a first frequency;
   a single data modulator for encoding signal data on the pulse train at a second data stream frequency where the second frequency is greater than or equal to the first frequency; and
   means for rotating a polarization state of at least alternate light pulses of the pulse train to provide a data stream of orthogonally polarized alternate light pulses comprising:
      a narrow band Mach Zehnder having a single input port and a first and a second output port for directing alternate light pulses to a first optical path and a second optical path respectively, including a driver electrically coupled to the pulse generator for synchronizing the narrow band Mach Zehnder to the frequency of the pulse train, wherein the driver selects the first or the second output port for each light pulse;
      a passive polarization rotator disposed on one of the first optical path and the second optical path for changing the polarization of light pulses passing therethrough; and
      means for combining orthogonally polarized light pulses from the first and second optical paths into a single data stream of alternate orthogonally polarized light pulses.

2. An optical modulator as defined in claim 1, wherein the means for modifying a laser light beam comprises a pulse generator for providing a pulse train of light pulses from a continuous wave laser beam.

3. An optical modulator as defined in claim 2, wherein the pulse generator produces pulses at substantially 40 GHz.

4. An optical modulator as defined in claim 1, wherein the first output port and the second output port are optically coupled to a polarization beam combiner through a half wave plate optically coupled to one of the first output port and the second output port, and through a spacer for providing an equal path length optically coupled to the other of the first output port and the second output port.

5. An optical modulator as defined in claim 3 wherein the narrow band Mach Zehnder has a frequency of substantially 20 GHz.

6. An integrated data modulator optical circuit comprising:
   a laser light source;
   a pulse generator comprising a first Mach-Zehnder device integrated on a substrate coupled to the laser light source for producing a pulse train;
   a data modulator comprising a second Mach-Zehnder device integrated on the substrate for encoding data on the pulse train; and
   means for interleaving alternate pulses of orthogonal polarization onto a single pulse train comprising a third Mach-Zehnder device integrated on the substrate having a first output port and a second output port for separating alternate pulses to a first optical path and a second optical path, further including a passive polarization rotator optically coupled to the first optical path for rotating at least alternate pulses, and a polarization combiner for interleaving alternate pulses from the first optical path and the second optical path.

7. An integrated data modulator optical circuit as defined in claim 6 further including means for redirecting and focusing light from a first integrated device into a second integrated device on the same substrate.

8. An integrated data modulator optical circuit as defined in claim 7, wherein the means for redirecting and focusing light comprises a graded index lens optically coupled at a first end to the substrate symmetrically disposed between the first integrated device and the second integrated device, and having a reflective element at a second end thereof.

9. An integrated data modulator optical circuit as defined in claim 6, wherein the narrow band Mach Zehnder has a frequency that is half the frequency of the data modulator and has a driver synchronized with the pulse generator.

10. A method of encoding data on a light pulse train of alternate polarization interleaved bits comprising the steps of:
   providing a single pulse train of light pulses at a first frequency;
   encoding data on the single pulse train at a second data stream frequency where the second frequency is greater than or equal to the first frequency;

passing alternate pulses, in dependence upon a clock synchronized with the pulse train, through a passive polarization rotator to rotate alternate pulses to orthogonal polarization states; and interleaving the orthogonally polarized pulses, by interleaving the alternate pulses from the polarization rotator with alternate pulses which did not pass through the polarization rotator for transmission in an optical system.

* * * * *